United States Patent [19]

Sridhar et al.

[11] Patent Number: 5,550,881
[45] Date of Patent: Aug. 27, 1996

[54] AUTOMATIC MODULATION MODE SELECTING UNIT AND METHOD FOR MODEMS

[75] Inventors: Manickam R. Sridhar, Holliston; Neil Sheer, Foxboro, both of Mass.

[73] Assignee: Motorola, Inc., Schaumburg, Ill.

[21] Appl. No.: 421,723

[22] Filed: Apr. 13, 1995

[51] Int. Cl.[6] .................................................. H04L 23/00
[52] U.S. Cl. .......................................... 375/377; 375/222
[58] Field of Search .................................. 375/222, 240, 375/295, 377; 455/93

[56] References Cited

U.S. PATENT DOCUMENTS

| | | | |
|---|---|---|---|
| 4,425,665 | 1/1984 | Stauffer | 375/223 |
| 4,931,250 | 6/1990 | Greszczuk | 375/222 |
| 5,317,594 | 5/1994 | Goldstein | 375/222 |
| 5,349,635 | 9/1994 | Scott | 375/222 X |

FOREIGN PATENT DOCUMENTS

| | | | |
|---|---|---|---|
| 8911183 | 11/1989 | WIPO | 375/222 |
| 9314583 | 7/1993 | WIPO | 375/222 |

Primary Examiner—Young T. Tse
Attorney, Agent, or Firm—Darleen J. Stockley

[57] ABSTRACT

An automatic modulation mode selecting unit (208) and a method (100) provide for selection from a plurality of modulation modes having an optimized transmission time for a data file. This is particularly useful where a small data file is to be transmitted, such as for a hand-held message pad. The present invention may select a modulation mode having a slow data rate but a short training time to achieve a shorter transmission time a small data file in comparison with using another modulation mode having a fast data rate but a longer training time, and thus a longer transmission time. The automatic modulation mode selecting unit includes a mode select controller (202), a mode computer (204), and a mode-select switch (206) for selecting a modulation mode based on a calculated optimized transmission time.

16 Claims, 2 Drawing Sheets

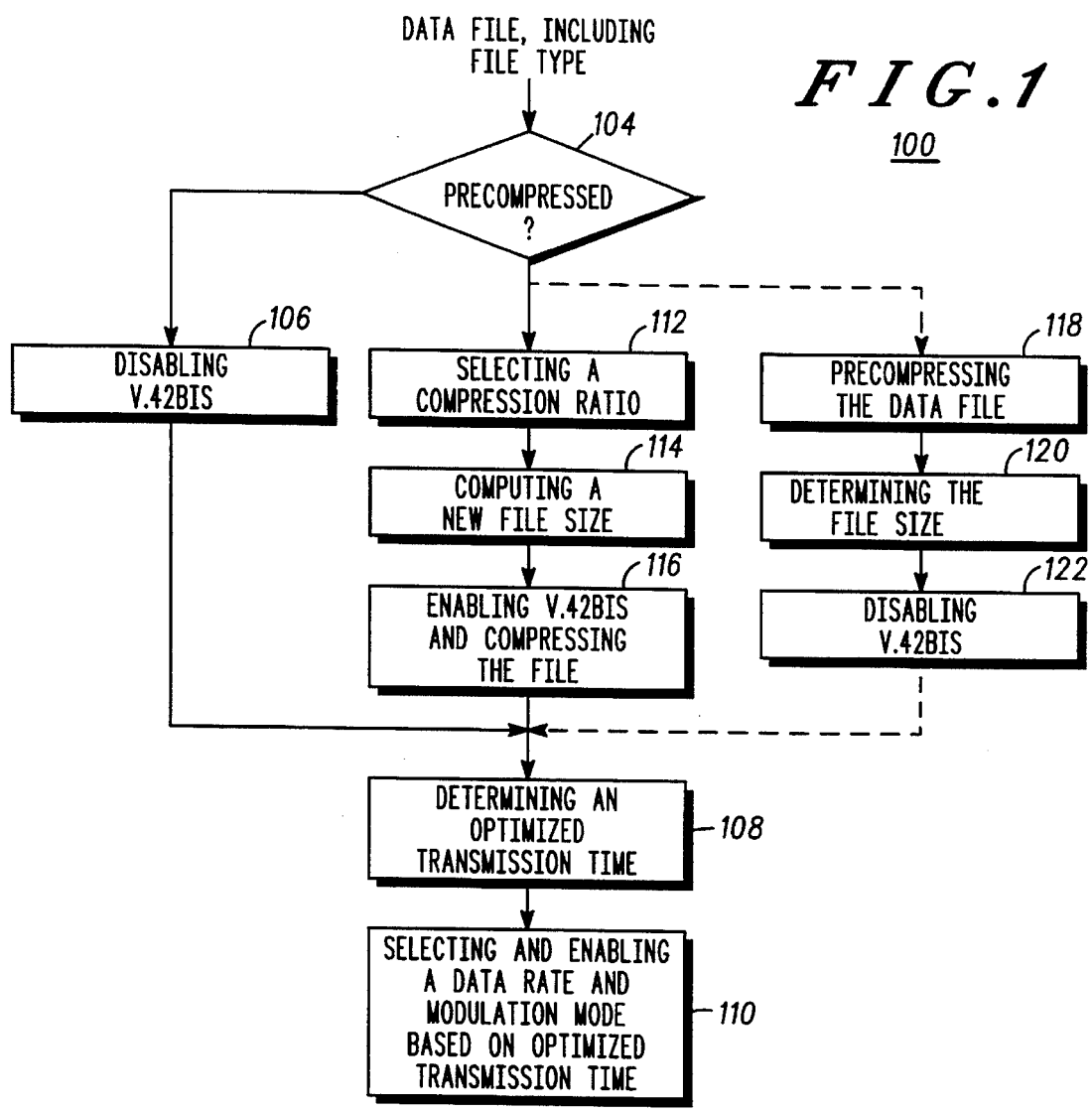
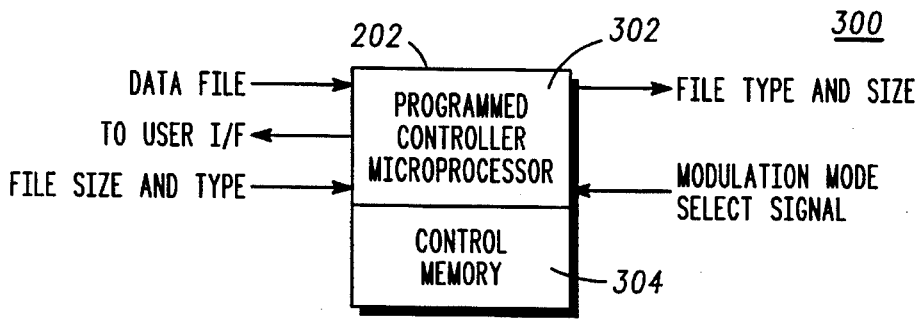

5,550,881

AUTOMATIC MODULATION MODE SELECTING UNIT AND METHOD FOR MODEMS

FIELD OF THE INVENTION

The present invention relates to modulation mode selection in a data communication system, and more particularly to automatic modulation mode selection from a plurality of available modulation modes for time efficient transmission of data by modems in a data communication system.

BACKGROUND

In accordance with CCITT (Comite Consultatif International de Telegraphie et Telephonie), the typical method employed for selection of a modulation mode for transmission of data (typically the contents of a file) is the automode method described in U.S. Pat. No. 4,931,250, Greszczuk, which is hereby incorporated by reference. The automode method provides for selection of a common modulation mode negotiated between a call and an answer modem for transmission of data. This is done by automatically choosing the modulation mode to achieve the highest common data rate. But, if the total connection time is to be minimized, the modulation mode selected by this method is sometimes inefficient because the automode method does not consider the size of the data file that has to be transferred or the time that is required for training the modems embodying the selected modulation mode before the actual transmission of data can commence. It is known that in order to communicate using the modulation modes which typically support higher data rates, a significant amount of time is required for training the modem's receivers and echo cancellers to sustain the higher data rates. However, in cases where the file to be transferred is short (i.e., has low data content), the training time may be longer than the actual time it takes to transfer the file. It is also understood that from the time the call is made to the time the entire contents of the file have been transferred, the communication channel and the modems are busy and hence unavailable to other users.

Thus, there is a need for an automatic modulation mode selecting unit and method for modems that provide efficient selection of a modulation mode and a related data rate before commencing data transmission.

BRIEF DESCRIPTION OF THE DRAWINGS

FIG. 1 shows one embodiment of the steps for selecting an optimized modulation mode in a modem in accordance with the method of the present invention.

FIG. 3 is a block diagram of one embodiment of the modem select controller of FIG. 2 in accordance with the present invention.

DETAILED DESCRIPTION OF A PREFERRED EMBODIMENT

Figure 2:
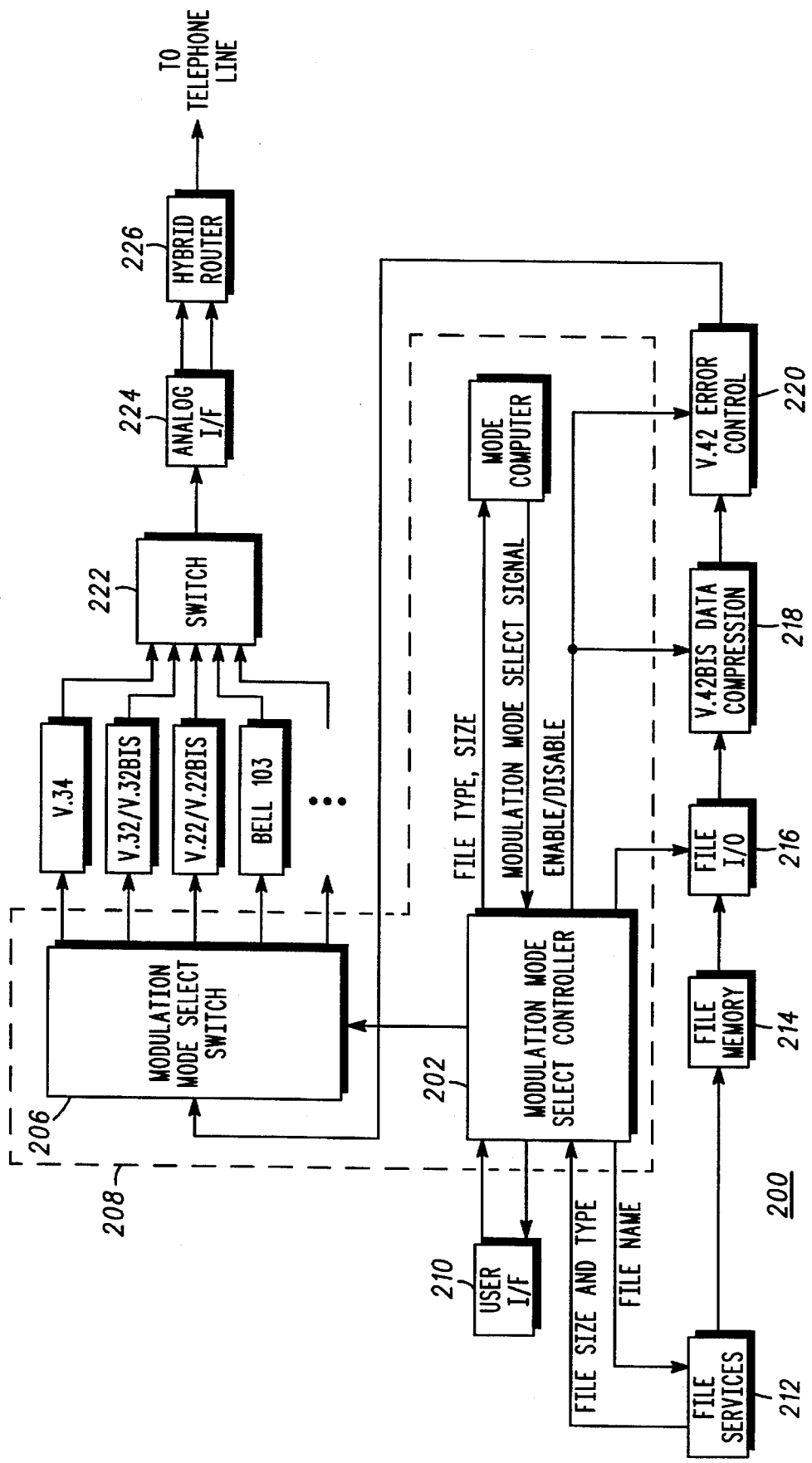
FIG. 2 is a block diagram showing an automatic modulation mode selecting unit for a calling modem in accordance with the present invention.

The present invention provides for selecting a modulation mode from a plurality of available modulation modes in a modem having an optimized transmission time. This invention is particularly useful where a small data file is to be transmitted, such as for a hand-held message pad like the Newton or the Envoy. In such a case, a modulation mode having a slow data rate but a short training time may require a shorter total transmission time for transmission of the small data file compared with another modulation mode combination having a fast data rate but a longer training time, and thus a longer total transmission time.

Thus, where the communications channel and the call and answer modems are kept busy for lesser amounts of time by optimally choosing a modulation mode and a related data rate that minimizes the total connection time, the communications channel and the modems can be utilized sooner by other users. Minimizing the connection time also significantly reduces the usage charges for the user and, in cases where the device is powered by batteries, drain on the batteries is reduced, enabling them to last longer before requiring recharging.

The present invention provides for automatic selection of an optimized modulation mode for connection with a receiving modem. The size of the file to be transferred and the training time needed to sustain and communicate at the respective maximum data rate supported for each of the available modulation modes are utilized to determine the most efficient modulation mode to be used for transferring the file.

FIG. 1, numeral 100, shows one embodiment of the steps for selecting an optimized modulation mode in accordance with the method of the present invention. Prior to transfer of a file, the calling modem determines the file type (e.g., data, voice, image, etc.). The method of the present invention provides for automatically selecting, by an automatic modulation mode selecting unit in a calling modem, an optimal modulation mode from a plurality of available modulation modes that provides for time efficient transmission of data to another modem. This is accomplished by utilizing a scheme that accounts for the file size and the training time required for each modulation mode to support its highest data rate, comprising the steps of: A) determining whether the data file has been precompressed (104); B) where the data file has been precompressed, B1) disabling V.42bis (106); B2) utilizing the data file size, maximum data rate for each available modulation mode and the training times for each available modulation mode, to determine an optimized transmission time period for the data file (108); B3) selecting and enabling a data rate and the modulation mode in the modem based on the optimized transmission time period (110); and C) where the data file is unprecompressed, one of C1–C5 and C6–C10: C1) selecting a compression ratio (112); C2) computing a new file 5 size (114); C3) enabling V.42bis and compressing the data file to a new data file size (116); C4) utilizing the data file size, maximum data rate for each available modulation mode and the training times for each available modulation mode to determine an optimized transmission time period for the data file (108); and C5) selecting and enabling a data rate and the modulation mode in the modem based on the optimized transmission time period (110); and C6) precompressing the data file (118); C7) determining the file size of the precompressed data file (120); C8) disabling V.42bis (122); C9) utilizing the file size, maximum data rate for each available modulation mode and the training times for each available modulation mode, to determine an optimized transmission time period for the data file (108); and C10) selecting and enabling a data rate and the modulation mode in the modem based on the optimized transmission time period (110).

The modulation mode is typically selected from one of a plurality of data rates available from a plurality of modulation modes such as V.34, V.32/V.32bis, V.22/V.22bis, and Bell 103.

The transmission time period for the data file for each of the available modulation modes is typically determined by summing a training time for each modulation mode and a quotient of the data file size divided by the modulation mode's respective maximum bit rate, i.e.:

$$\text{Transmission time } i = \{\text{training time}_i + (\text{filesize}/\text{maximum bit rate}_i)\}.$$

Where i is the modulation mode index.

Typically, i is an integer number and may be assigned as follows:

i=1 indicates V.34 i=2 indicates V.32bis i=3 indicates V.22bis etc. . . .

The modulation mode that is selected for achieving the optimal transmission time is the modulation mode that is indicated by the index i corresponding to the minimum transmission time of all computed Transmission time $_i$'s:

$$\text{Modulation mode select} = i = F\{\text{Min}(\text{Transmission time } i)\}.$$

Alternatively, the automatic modulation mode selecting unit may comprise: A) a mode computer (204), operably coupled to a modulation mode select controller, for determining an optimal modulation mode for sending a data file based on file size and type, and for sending a modulation mode select signal to the modulation mode select controller indicating the optimal modulation mode; and B) the modulation mode select controller (202) having a control memory, coupled to receive the data file from a user, a file services unit and the mode computer, for utilizing the data file to provide the file size and type to the mode computer, for, upon receiving the modulation mode select signal, enabling/disabling a predetermined scheme for selectable implementation of V.42/V.42bis on the data file and for sending a modem select signal indicating the optimal modulation mode, wherein the optimal modulation mode is based on an optimized transmission time period that is determined based on a training time required for each modulation mode available, the data file size and the maximum data rate for each available modulation mode.

FIG. 2, numeral 200, is a block diagram showing an automatic modulation mode selecting unit for a calling modem in accordance with the present invention. The automatic modulation mode selecting unit (208) automatically selects an optimal modulation mode from a plurality of modulation modes for transferring a data file to another modem utilizing the file size, maximum data rate for each available modulation mode and the training time for each available modulation mode, to determine an optimized transmission time period for the data file, the modulation mode selecting unit comprising: A) a modulation mode select controller (202) having a control memory, operably coupled to receive a data file of a user and to interoperate with the user interface, coupled to a file services unit for receiving a file type and size, and coupled to a mode computer (204) for providing a file type and size to the mode computer, for, upon receiving a modulation mode select signal, enabling/disabling V.42 and V.42bis in accordance with a predetermined scheme, for sending a signal to a file input/output unit (216) in correspondence with a scheme for selectable implementation of V.42/V.42bis and for sending a modem select signal to a modulation mode select switch; B) the mode computer (204), operably coupled to the modulation mode select controller, for utilizing the file size, maximum data rate for each available modulation mode and the training times for each available modulation mode, for determining an optimized transmission time period for the data file, and sending a modulation mode select signal to the modulation mode select controller indicating an optimal modulation mode in accordance with the optimized transmission time period; and C) the modulation mode select switch (206), operably coupled to the modulation mode select controller (202) and to receive the data file after V.42/V.42bis scheme implementation, for selecting an optimal modulation mode (e.g., V.34, V.32/V.32bis, V.22/V.22bis, Bell 103) for transmission of the data file in accordance with a maximum data rate for the optimal modulation mode indicated by the modem select signal.

The data rate is typically selected from a plurality of maximum data rates, e.g. 28,800 bps, 14,400 bps, 2400 bps, 300 bps, etc., and the modulation mode is typically selected from a plurality of modulation modes, e.g., V.34, V.32/V.32bis, V.22/V.22bis, and Bell 103, etc. The optimized transmission time period for the data file is determined as set forth above. The modulation mode is also selected as set forth above.

In one embodiment, set forth in FIG. 3, numeral 300, the modulation mode select controller (202) includes a microprocessor (302) programmed with communication software and having a control memory (304). A user at the user interface (USER I/F; 210) sends a file name to the modulation mode select controller (202), and the modulation mode select controller (202) transmits the file name to a file services unit (212). The file services unit (212) transmits the file size and type to the modulation mode select controller (202) and transfers the file to file memory (214). The file is then transferred to a file input/output unit (FILE I/O; 216) for output upon a signal from the modulation mode select controller (202). The modulation mode select controller (202) transmits the file size and type to the mode computer (204), and the mode computer (204) computes the training time for each data rate modem plus a transmittal time for sending the data file by the modem, which together make up the total transmission time required for the data file. Since training times for different modulation modes vary, it may take less time to transmit a relatively small data file using a slower data rate and modulation mode than using a faster data rate and modulation mode. The modulation mode select controller (202) determines the shortest transmission time of all the transmission times computed for the available data rate and modulation mode and sends a signal to the modulation mode select switch (206), selecting the data rate and modulation mode having the shortest, i.e., optimized, transmission time. In addition, the modulation mode select controller (202) enables/disables either or both of a V.42bis data compression unit (218) and a V.42 error control unit (220) in accordance with a preselected scheme implemented by the programmed controller microprocessor (302). The data file is transmitted to the V.42bis data compression unit (218) and then to the V.42 error control unit (220), which, where selected, compress the data file and, where selected, utilize V.42 error control. The data file is then sent to the modulation mode select switch (206), which transmits the data file to the modulation mode unit selected by the modulation mode select controller (202), which then typically sends the data file to a switch (222), then to an analog interface (ANALOG I/F; 224), to a 2 to 4 wire converter (HYBRID; 226), and then to a telephone line.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. An automatic modulation mode selecting unit in a calling modem for automatically selecting an optimal modulation mode from a plurality of modulation modes, the automatic modulation mode selecting unit comprising:

A) a mode computer, operably coupled to a modulation mode select controller, for determining the optimal modulation mode for a data file based on file size and type, and for sending a modulation mode select signal to the modulation mode select controller indicating the optimal modulation mode; and B) the modulation mode select controller having a control memory, coupled to receive the data file from a user, a file services unit and the mode computer, for utilizing the data file to provide the file size and type to the mode computer, and, upon receiving the modulation mode select signal, enabling/disabling a predetermined scheme for selectable implementation of V.42/V.42bis on the data file and for sending a modem select signal indicating the optimal modulation mode, wherein the optimal modulation mode is based on an optimized transmission time period that is determined based on a training time required for each modulation mode available, the data file size and the maximum data rate for each available modulation mode.

2. The automatic modulation mode selecting unit of claim 1 wherein the modulation mode selected is one of: V.34, V.32/V.32bis, V.22/V.22bis, and Bell 103.

3. The automatic modulation mode selecting unit of claim 1 wherein the data rate is a data rate supported by of one of a plurality of data rates supported by: V.34, V.32/V.32bis, V.22/V.22bis, and Bell 103.

4. The automatic modulation mode selecting unit of claim 1 wherein the optimized transmission time period for the data file in each modulation mode is determined by summing the training time required for each modulation mode available and a quotient of the data file size divided by the modulation mode's maximum data rate.

5. An automatic modulation mode selecting unit in a calling modem for automatically selecting an optimal modulation mode from a plurality of modulation modes for transferring a data file to another modem, the automatic modulation mode selecting unit comprising:

A) a modulation mode select controller having a control memory, operably coupled to receive a size and type of the data file, and to receive a modulation mode select signal, for, upon receiving the data file from a user, sending the name of the data file to a file services unit which returns a file size and type and sends the data file to a file memory and then to a file input/output unit, for, upon receiving the file size and type, providing the file size and type to a mode computer, for, upon receiving the modulation mode select signal, enabling/disabling V.42, V.42bis and the input/output unit in accordance with a predetermined scheme for selectable implementation of V.42/V.42bis on the data file and for sending a modem select signal to a modulation mode select switch;

B) the mode computer, operably coupled to the modulation mode select controller, for determining the optimal modulation mode for sending the data file, and for the modulation mode select signal to the modulation mode select controller indicating the optimal modulation mode; and C) the modulation mode select switch, operably coupled to the modulation mode select controller and to receive the data file after V.42/V.42bis scheme implementation, for selecting the optimal modulation mode indicated by the modem select signal, wherein the optimal modulation mode is based on an optimized transmission time period that is determined based on a training time required for each modulation mode available, the data file size and the maximum data rate for each available modulation mode.

6. The automatic modulation mode selecting unit of claim 5 wherein the modulation mode selected is one of: V.34, V.32/V.32bis, V.22/V.22bis, and Bell 103.

7. The automatic modulation mode selecting unit of claim 5 wherein the data rate is a data rate supported by of one of a plurality of data rates supported by: V.34, V.32/V.32bis, V.22/V.22bis, and Bell 103.

8. The automatic data rate selecting unit of claim 5 wherein the optimized transmission time period for the data file in each modulation mode is determined by summing the training time required for each modulation mode available and a quotient of the data file size divided by the modulation mode's maximum bit rate.

9. An automatic modulation mode selecting unit in a calling modem for automatically selecting an optimal modulation mode from a plurality of modulation modes for transferring a data file to another modem utilizing a scheme based on a training time required for each modulation mode available, the data file size and the maximum data rate for each available modulation mode, the automatic modulation mode selecting unit comprising:

A) a modulation mode select controller having a control memory, operably coupled to receive the data file of a user and to interoperate with the user interface, coupled to a file services unit for receiving the data file type and size, and coupled to a mode computer for providing the file type and size to the mode computer, for, upon receiving a modulation mode select signal, enabling/disabling V.42 and V.42bis in accordance with a predetermined scheme, for sending a signal to a file input/output unit in correspondence with the scheme for selectable implementation of V.42/V.42bis and for sending a modem select signal to a modulation mode select switch;

B) the mode computer, operably coupled to the modulation mode select controller, for utilizing the data file size, maximum data rate for each available modulation mode and the training time required for each available modulation mode, for determining an optimized transmission time period for the data file, and sending the modulation mode select signal to the modulation mode select controller indicating the optimal modulation mode in accordance with the optimized transmission time period; and C) the modulation mode select switch, operably coupled to the modulation mode select controller and to receive the data file after V.42/V.42bis scheme implementation, for selecting the optimal modulation mode for transmission of the data file in accordance with the maximum data rate for the optimal modulation mode indicated by the modem select signal.

10. The automatic modulation mode selecting unit of claim 9 wherein the modulation mode selected is one of: V.34, V.32/V.32bis, V.22/V.22bis, and Bell 103.

11. The automatic modulation mode selecting unit of claim 9 wherein the data rate is a data rate supported by of one of a plurality of data rates supported by: V.34, V.32/V.32bis, V.22/V.22bis, and Bell 103.

12. The automatic data rate selecting unit of claim 9 wherein the optimized transmission time period for the data file in each modulation mode is determined by summing a training time required for each modulation mode available and a quotient of the data file size divided by the modulation mode's maximum data rate.

13. A method for automatically selecting, by a call modem, an optimized modulation mode from a plurality of modulation modes for transferring a data file to another modem utilizing a scheme based on a file size, maximum data rate for each available modulation mode and training time required for each available modulation mode, to determine an optimized transmission time period for the data file, comprising the steps of:

A) determining whether the data file has been precompressed;

B) where the data file has been precompressed,
   B1) disabling V.42bis;
   B2) utilizing the file size, the maximum data rate for each available modulation mode and the training time required for each available modulation mode to determine the optimized transmission time period for the data file;
   B3) selecting and enabling a data rate and modulation mode based on the optimized transmission time period;
and C) where the data file is unprecompressed, one of C1–C5 and C6–C10:
   C1) selecting a compression ratio;
   C2) computing a new file size;
   C3) enabling V.42bis and compressing the data file to a new data file size;
   C4) utilizing the new file size, maximum data rate for each available modulation mode and the training time required for each available modulation mode, to determine the optimized transmission time period for the data file; and
   C5) selecting and enabling a data rate and modulation mode based on the optimized transmission time period; and
   C6) precompressing the data file;
   C7) determining the file size of the precompressed data file;
   C8) disabling V.42bis;
   C9) utilizing the file size, maximum data rate for each available modulation mode and the training time required for each available modulation mode, to determine the optimized transmission time period for the data file;
   C10) selecting and enabling a data rate and modulation mode based on the optimized transmission time period.

14. The method of claim 13 wherein the modulation mode selected is one of: V.34, V.32/V.32bis, V.22/V.22bis, and Bell 103.

15. The method of claim 13 wherein the data rate is a data rate supported by of one of a plurality of data rates supported by: V.34, V.32/V.32bis, V.22/V.22bis, and Bell 103.

16. The method of claim 13 wherein the optimized transmission time period for the data file is determined by summing the training time required for each modulation mode available and a quotient of the data file size divided by the modem's maximum data rate.

* * * * *